(12) United States Patent
Guttenberger et al.

(10) Patent No.: US 6,637,903 B2
(45) Date of Patent: Oct. 28, 2003

(54) MULTI-PART DRIVE HOUSING FOR AN ACTUATOR FOR MOTOR VEHICLE MIRRORS

(75) Inventors: Richard Guttenberger, Greding (DE); Arno Schieweck, Kleinlangheim (DE)

(73) Assignee: Buehler Motor GmbH, Nuremberg (DE)

( * ) Notice: Subject to any disclaimer, the term of this patent is extended or adjusted under 35 U.S.C. 154(b) by 0 days.

(21) Appl. No.: 09/955,294

(22) Filed: Sep. 19, 2001

(65) Prior Publication Data

US 2002/0057507 A1 May 16, 2002

(30) Foreign Application Priority Data

Sep. 20, 2000 (DE) .......................................... 100 46 482

(51) Int. Cl.[7] .............................................. G02B 7/182
(52) U.S. Cl. ...................................... 359/877; 248/476
(58) Field of Search ................................ 359/838, 842, 359/871, 872, 876, 877; 248/476

(56) References Cited

U.S. PATENT DOCUMENTS

| 5,042,932 A | * | 8/1991 | Pent ............................ 359/877 |
| 5,477,391 A | * | 12/1995 | Boddy ......................... 359/841 |
| 5,851,064 A | * | 12/1998 | Lyons ......................... 362/494 |
| 5,938,166 A | | 8/1999 | Seichter et al. |
| 5,969,891 A | * | 10/1999 | Otenio et al. ................ 359/872 |
| 6,174,062 B1 | | 1/2001 | Schillegger et al. |

FOREIGN PATENT DOCUMENTS

| DE | 197 19 192 A1 | 11/1998 | ............. B60R/1/02 |
| DE | 199 19 529 A1 | 8/2000 | ............ B60R/1/072 |
| WO | WO 98/18653 | 5/1998 | ............. B60R/1/06 |

* cited by examiner

Primary Examiner—Euncha Cherry
(74) Attorney, Agent, or Firm—Jacobson Holman PLLC

(57) ABSTRACT

Actuator for a mirror disc to be mounted on a motor vehicle with a drive housing that may be fixed relative to the motor vehicle and accepts at least one electric drive in a drive chamber and a carrier element for the mirror disc. The carrier element is mounted such that it may be pivoted relative to the drive housing around two different pivot axes and may be driven by the at least one electric drive. The drive housing is constructed in two parts, forming the aforementioned drive chamber and a component chamber for accepting electronic components. The component chamber is separated from the drive chamber.

7 Claims, 2 Drawing Sheets

MULTI-PART DRIVE HOUSING FOR AN ACTUATOR FOR MOTOR VEHICLE MIRRORS

BACKGROUND OF THE INVENTION

1. The Field of the Invention

The invention relates to an improvement in an actuator forming part of a mirror disc for attachment to a motor vehicle.

2. Description of Related Art

Actuators for motor vehicle mirrors have been known for a long time. As a rule, they comprise a drive housing and a carrier plate for a mirror disc. The drive housing is generally fixed to the motor vehicle. The carrier plate for the mirror disc is driven and may be pivoted relative to the drive housing. Pivoting of the carrier plate occurs by means of electric motors that are arranged in the drive housing. Because the motor vehicle mirror as a whole is supposed to occupy as little outside volume as possible, the arrangement of the drive housing and the carrier plate must be as compact as possible.

In a prior art embodiment known from U.S. Pat. No. 6,174,062, Adjustable Rear-View Mirror For A Vehicle, the carrier plate is fixed in the middle by means of a screw running through the middle of the drive housing in such a way that the carrier plate may be pivoted around two pivot axes that run perpendicular to one another. However, the inner chamber of the drive housing is separated by the screw that runs through the middle of the drive housing in such a way that it is essentially impossible to introduce additional electronic components into the drive housing.

BRIEF SUMMARY OF THE INVENTION

An object of the invention is to create an actuator for a mirror disc to be mounted on a motor vehicle in which electronic components are integrated into the actuator so as to save as much space as possible.

The object is attained by constructing the drive housing so that it is in two parts forming a drive chamber for holding electric motors and a component chamber for holding electronic components. The core of the invention lies in constructing the drive housing in two parts, with the electric drive being disposed in one part of the drive housing and the electronic components in the other part of the drive housing. Both parts of the drive housing together form the drive housing. At the same time, the drive chamber is separated from the component chamber.

Further advantageous constructions of the invention can be found in the subclaims.

Additional features and details of the invention can be found in the description of an exemplary embodiment with reference to the drawings, which show:

DETAILED DESCRIPTION OF THE INVENTION

The description of the invention provided herein is a improvement over the actuator disclosed in U.S. patent application Ser. No. 09/559,398, filed Apr. 29, 1999 now U.S. Pat. No. 6,341,536, and entitled Actuating Mechanism for Motor Vehicles. The disclosure of U.S. patent application Ser. No. 09/559,398 is incorporated by reference herein in its entirety as if reproduced in full. In this way, the '398 patent application provides a more detailed description of certain elements discussed herein but not needed to define the invention.

Figure 1:
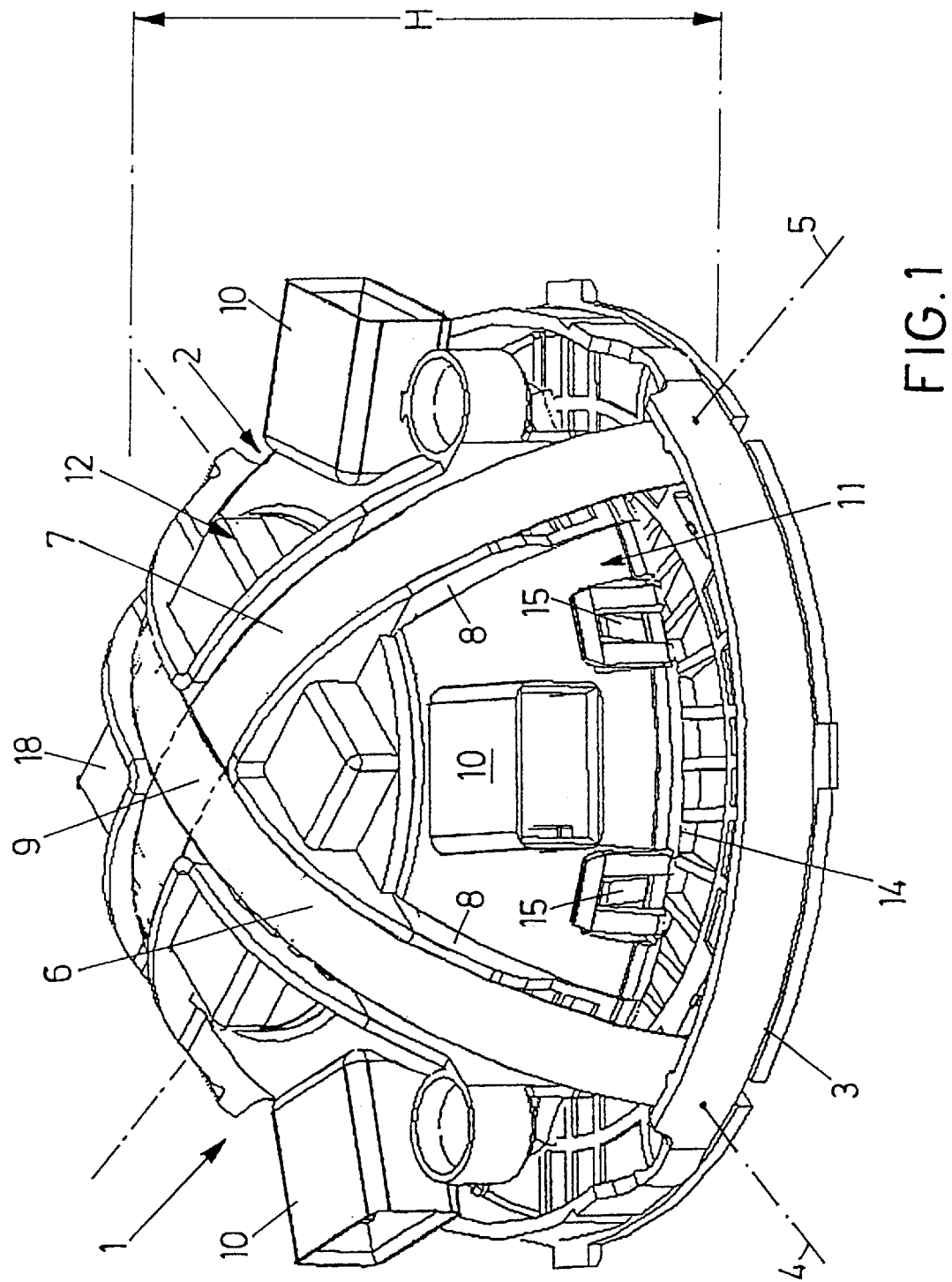
FIG. 1 is a top view of an actuator with a carrier plate and a drive housing.

Now with reference to FIG. 1, according to the present invention, an actuator 1 for a mirror disc (not shown) to be mounted on a motor vehicle has a drive housing 2 essentially in the shape of a spherical cap, which can be mounted on the motor vehicle. A carrier plate 3 for the mirror disc may be pivoted relative to the drive housing 2 around two pivot axes 4 and 5 running perpendicular to one another. Two adjustment strips 6 and 7 made of metal run perpendicular to one another and are attached on their respective ends to edge points of the carrier plate 3 lying across from one another. The adjustment strips 6 and 7 are guided in a displaceable manner into guide tracks 8 that are open to the outside and run on meridians on the drive housing 2. The adjustment strips 6 and 7 cross one another at an angle of 90° at the upper midpoint 9 of the drive housing 2.

In the drive housing 2, two electric motors (not shown) are provided with gear systems assigned to them that engage the adjustment strips 6 and 7, which have a toothed strip in this region, through openings located in the drive housing 2 below the adjustment strips 6 and 7. When the electric motors are activated, the adjustment strips 6 and 7 can be moved relative to the drive housing 2 and thus the carrier plate 3 can be pivoted relative to the drive housing 2 around the pivot axes 4 and 5. The supply of electricity and the control of the electric motors occur by way of sockets 10 arranged on the drive housing 2. As stated before, the basic construction of the actuator 1, as well as, in particular, the bearing of the carrier plate 3 relative to the drive housing 2 is shown and discussed in U.S. patent application Ser. No. 09/559,398, and such showing and discussion is incorporated in full as if reproduced in full herein.

Figure 2:
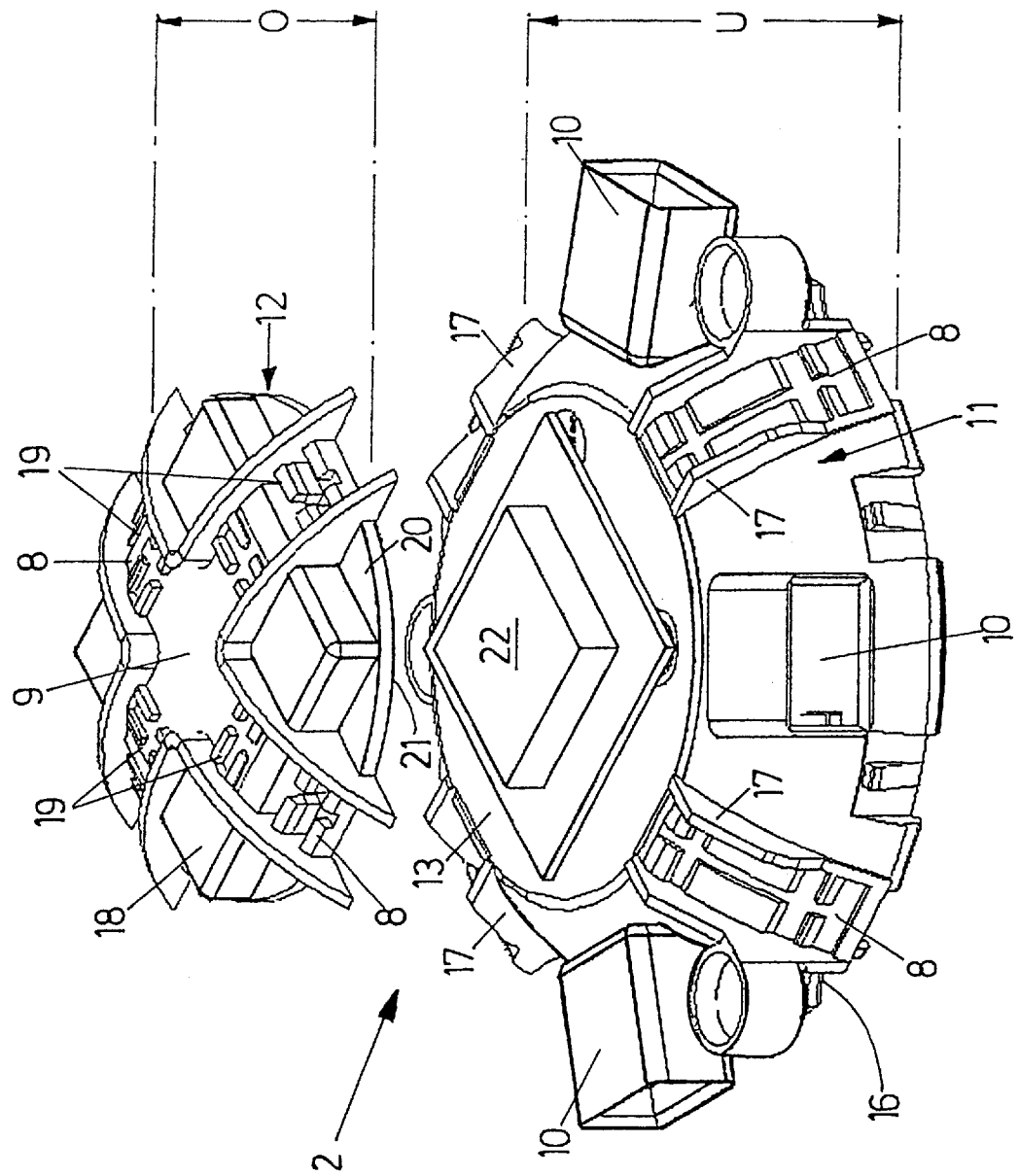
FIG. 2 is an exploded view of the drive housing.

The inventive structure of the drive housing 2 will be described in greater detail with reference to FIGS. 1 and 2. The drive housing 2 in the shape of a spherical cap comprises a lower housing component 11 and an upper housing component 12 arranged thereon. The housing component 11 is essentially in the shape of a spherical segment defined by two spaced base planes, i.e., the shape of a body that results from a layer being removed from a sphere using two cuts made by planes running essentially parallel to one another. The upper housing component 12 has the form of a spherical segment, with the lower housing component 11 and the upper housing component 12 arranged thereon together forming the spherical cap-shaped drive housing 2. On its side facing the housing component 12, the housing component 11 has an essentially flat base 13. On the side facing the carrier plate 3, the housing component 11 is locked by means of a cover 14 that is interlocked with the housing component 11 by way of locking arms 15. The housing component 11 surrounds a hollow drive chamber 16 in which the electric motors and the assigned gear systems are provided. The height U perpendicular to the surfaces spanned by the pivot axes 4 and 5 is selected in such a way that the electric motors and the gear systems have just enough space in the drive chamber 16. Lower sections 17 of the guide tracks 8 are provided on the housing component 11.

The upper housing component 12 has an essentially cuboid component chamber cover 18 that is open on one side in the direction of the housing component 11 and upon which the upper sections 19 of the guide tracks 8 are arranged. The sections 17 and 19 together form the guide tracks 8. On the side of the cover 18 facing the housing component 11, the upper housing component 12 has a round base plate 20 surrounding the cover 18 in the manner of a ring whose diameter corresponds to that of the circular base 13 and runs parallel thereto. By means of the base 13 and the cover 18, a hollow cuboid component chamber 21 is created with a limited volume. The component chamber 21 can also have another form, for example, round or the shape of a spherical cap. In the component chamber 21, one or more electronic components 22 are arranged and are surrounded in a protective manner on all sides. The component 22 is connected to the electric motors by way of electric lines (not shown) that run through the base 13 to the drive chamber 16. It is possible to glue, lock, or weld the base plate 20 to the base 13. It is also possible to create a watertight connection. However, the two housing components 11 and 12 can be held together in a particularly advantageous manner solely by the adjustment strips 6 and 7, which are slightly pre-stressed in relation to the drive housing 2.

The height O of the housing component 12 is selected in such a way that, when combined with the height U of the housing component 11, the height H of the spherical cap-shaped drive housing 2 results. This means that the height O can be selected to be greater and thus the volume of the component chamber 21 can be selected to be greater, the smaller the height U is. In an optimal utilization of the drive chamber 16 for the electric motors and gear systems, the height U is minimized.

By creating a component chamber 21 above the drive chamber 16, it is possible to integrate the electronic components into the drive housing 2 in a space-saving manner and such that they are protected from environmental influences, particularly moisture. By means of the electronic components 22, it is possible for the actuator 1 to automatically perform a large number of complex functions such as, for example, an automatic basic adjustment of the mirror for various users of the motor vehicle. Moreover, it is possible to accommodate a control switch with bus receivers. It is also possible to integrate other mirror functions such as, for example, a blinker, area lighting, or a mirror-heating unit. The total size of the drive housing 2, which is limited outwards by the adjustment strips 6 and 7, is increased insignificantly by the creation of the component chamber 21.

It is apparent to those skilled in the art that various modifications and variations can be made in the present invention without departing from the scope of the invention. It is intended that the present invention include such modifications and variations as come within the scope of the appended claims and their equivalents.

What is claimed is:

1. An actuator for a mirror disc to be attached to a motor vehicle, the actuator comprising:

a drive housing in the shape of a spherical cap having a component chamber and a drive chamber, the drive chamber sized to receive at least one electric drive, the component chamber sized to receive electronic components, and the component and drive chambers being separated from each other;

means for securing the drive housing to the motor vehicle;

a carrier element for holding the mirror disc, the carrier element being mounted on the drive housing so that it is pivoted relative to the drive housing around two different pivot axes by the at least one electric drive; and two adjustment strips that are fixed relative to the carrier element and are guided in a displaceable manner on the drive housing for the purpose of pivoting the carrier element relative to the drive housing.

2. An actuator in accordance with claim 1, wherein the adjustment strips run perpendicular to one another.

3. An actuator in accordance with claim 1, wherein the adjustment strips encompass the drive chamber and the component chamber.

4. An actuator in accordance with claim 1, the drive housing comprising:

a first drive housing component including the drive chamber; and a second drive housing component including the component chamber.

5. An actuator in accordance with claim 4, wherein the first drive housing component is constructed in the shape of a spherical segment defined by two spaced base planes.

6. An actuator in accordance with claim 4, wherein the second drive housing component is constructed in the shape of a spherical cap.

7. Actuator in accordance with claim 5, wherein the first drive housing component has a base on its side facing away from the carrier element that defines the boundary of the component chamber in one direction.

* * * * *